Sept. 1, 1931. J. ROBINSON 1,821,115
AUTOMATIC TRAIN PIPE COUPLING
Filed Oct. 20, 1920  2 Sheets-Sheet 2
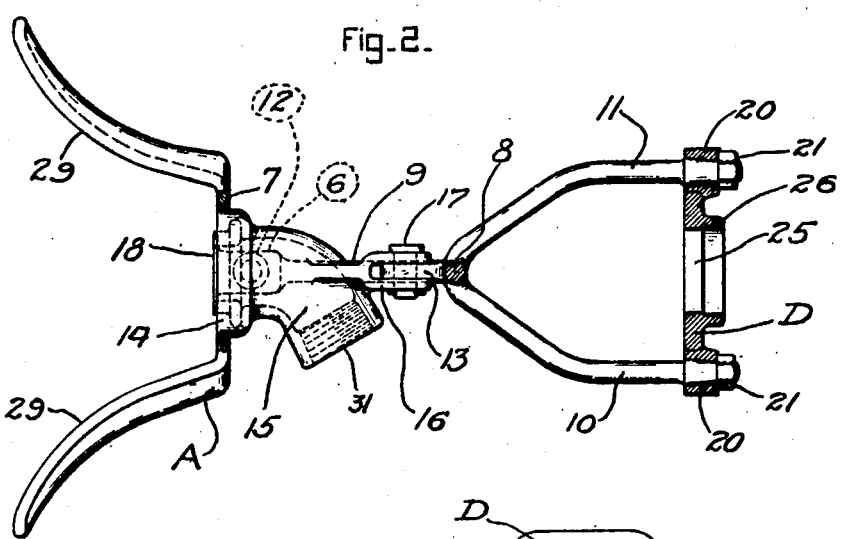
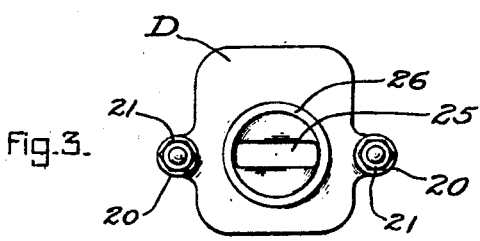
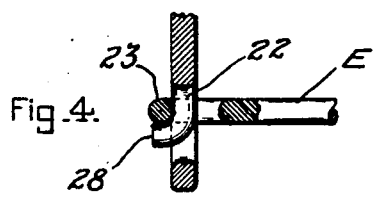
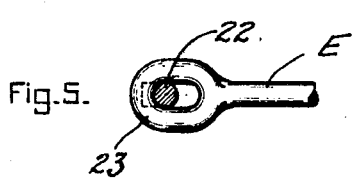
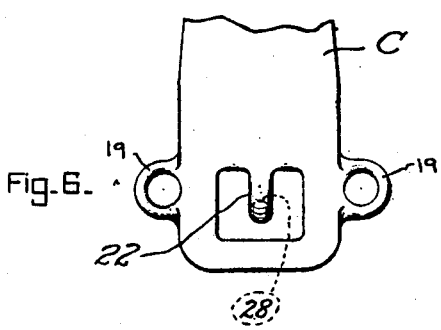
Joseph Robinson Inventor
By his Attorneys
Watson, Coit, Morse & Grindle Patented Sept. 1, 1931

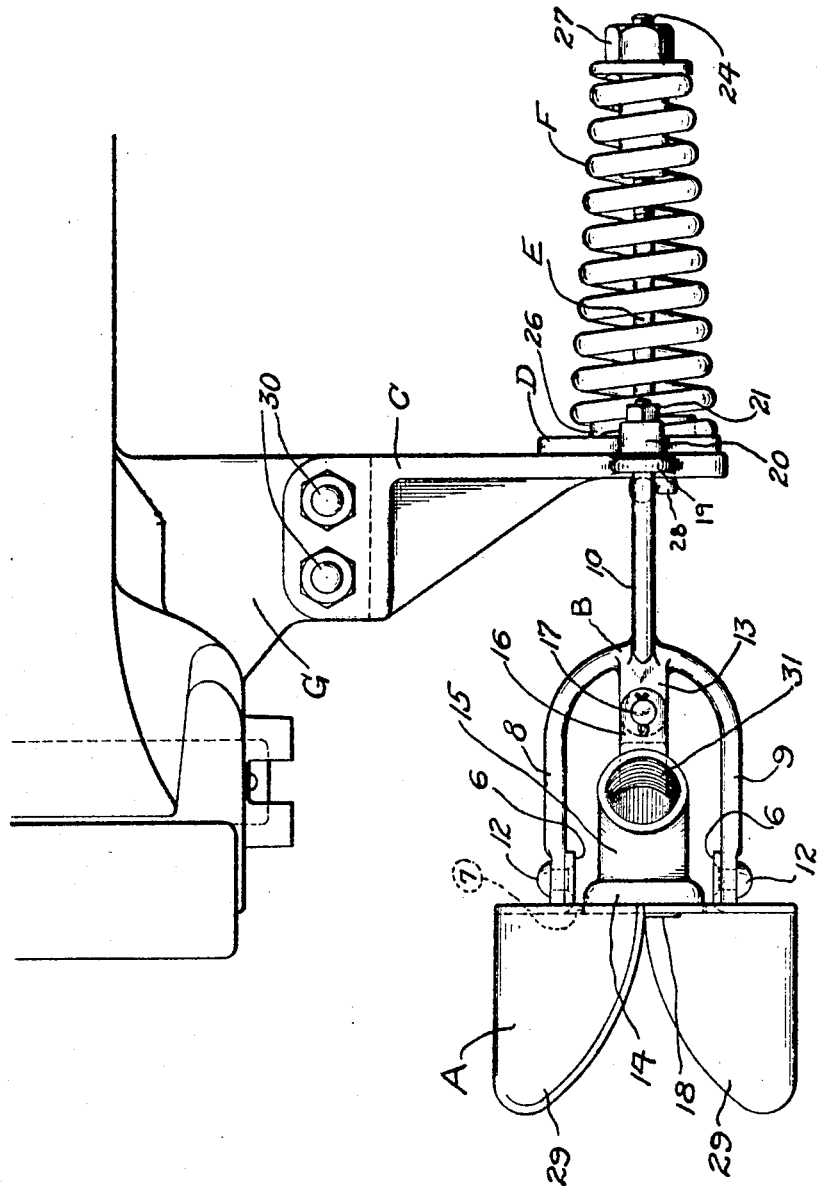

1,821,115

UNITED STATES PATENT OFFICE

JOSEPH ROBINSON, OF MORRISTOWN, NEW JERSEY

AUTOMATIC TRAIN PIPE COUPLING

Application filed October 20, 1920. Serial No. 418,233.

My invention relates to improvements in automatic train pipe couplings, and it consists in the constructions, combinations and arrangements hereinafter described and claimed.

An object of my invention is to provide an improved support for automatic train pipe couplings. Another object is to improve the coupling head of such devices, while a still further object is to provide an improved means for removably mounting and properly positioning a conduit in the coupling head. Other features of my invention are described in the following specification, pointed out in the appended claims, and illustrated in the accompanying drawings in which Figure 1 is a side elevation of my improvement.

Figure 2 is a plan view showing certain parts thereof assembled. In this view the base C, and certain other parts including the universal joint comprising the member 22 and the pivot device E are omitted.

Figure 3 is a rear elevation of the flange or plate D.

Figure 4 is a detailed sectional view of the universal joint construction of my improvement.

Figure 5 is a plan view of the forward end 23 of the pivot device E, and

Figure 6 is a rear elevation of the lower end of the bracket or base.

Referring to the drawings: My improvement comprises a sheet metal coupling head A having struck therefrom or otherwise secured thereto, a pair of ears 6 which lie above and below the opening 7 in the head, the latter being preferably located substantially at the center of the head and between said ears. A member of yoke B having the general shape of two clevises joined at their bases, one clevis being disposed in the vertical plane and the other in the horizontal plane, is connected to the coupling head A. The yoke thus constructed comprises four prongs or members 8, 9, 10, and 11 round in cross section, the members 8 and 9 being connected to the ears 6 of the head A as by rivets 12 as shown. At the junction of the members 8 and 9 I provide a perforated projection 13, while in the opening 7 of the head I loosely mount the enlarged end 14 of a hollow conduit 15 having a perforated fork 16 which spans the projection 13 and is secured thereto by the removable pin 17. By this arrangement the conduit is properly positioned in the opening 7, and properly supported between the members 8 and 9, and may be removed and replaced at will, both while the cars are in the coupled and uncoupled position. A suitable gasket 18 is mounted in the enlarged end 14 of the conduit 15 and may, by removing the conduit, be renewed without first parting the coupled cars.

The connection at 13 may be considered a flexible support for the conduit 15, since the conduit may move relative thereto, and to the head A, sufficiently to adjust itself with a mating conduit in coupling. By removing the pin 17 the fork 16 of the conduit may be dropped below the projection 13 and the conduit removed out of the opening 7 and from between the forks 8 and 9.

The members 10 and 11 of the yoke lie in the horizontal plane as aforesaid. They extend to the rear of the base or bracket and embrace or span the same, the base being provided at opposite sides of its lower end with integral perforated projections or trunnions 19, the walls of which are round in cross section as shown especially in Figure 6. Through the openings in these projections the members 10 and 11 loosely extend, thus providing an arrangement by which the coupling head A is properly supported with respect to the base C and presented from unduly rotating about its longitudinal axis as shown particularly in Figure 2. The rear ends of the members 10 and 11 are threaded, and are tapered to fit in complementary openings in the boses 20 of the flange or plate D, which plate is positioned at the rear of the base C and normally rests there against. Suitable nuts 21 detachably secure the plate in its assembled relation to the members 10 and 11.

The lower end of the base C is provided with an opening, and with an integral cylindrically shaped lug or trunnion 22 which extends downward from the upper wall of the opening. An eye bolt, or pivot device, having a perforated head 23, round in cross section, is hooked over the trunnion and is adapted to move universally thereon. It is provided with a shank, threaded at 24, which extends through the elongated opening 25 in the flange or plate D and for a considerable distance to the rear of the base C. A spiral supporting spring F, which serves to project the coupling head A forward of the base C and to yieldingly support the head, surrounds this shank and bears upon the annular seat 26 of the plate D between the lugs 20, while a nut 27 is screwed on to the threaded end 24 of the eye bolt and serves both to maintain the spring in position and to vary the resistance thereof against the plate D. To prevent the eye bolt from slipping off the trunnion 22 I provide the latter with a tit or snout 28.

The coupling head A of my improvement may be provided with any desired means for alining it with a counterpart head, but I preferably provide a pair of diagonally spaced, forwardly extending outwardly diverting guiding prongs 29 for this purpose. The base C may, of course, be secured to the usual lug G of the car coupler in any desired manner as by bolts 30, while the ordinary hose (not shown) of the car may be connected with the threaded portion 31 of the conduit 15 either by means of the usual hose nipple or through the medium of some other satisfactory coupling such for instance as a union.

The foregoing described construction produces a simple and efficient automatic train pipe coupling in which the relatively light but powerful pressed steel coupling head A is yieldedly maintained in the normal uncoupled position, with the plate D bearing against the rear side of the base C, by the resistance of the buffer spring F, the universal joint, formed by the trunnion 22 and the eye bolt E, permitting free universal movement to the head so that it may readily accommodate itself to the various conditions of service without causing mated heads to rock or move one upon the other. The various parts of my improvement are, of course, so arranged and proportioned as to permit the coupling head A to thus universally move, and may be constructed of any suitable material.

What I claim is:

1. In an automatic train pipe coupling, the combination of a base, a coupling head, a member for supporting said head on said base, an abutment engaging the rear side of the base, means for detachably securing said member to said abutment, a spring at the rear of said base and acting upon said abutment for extending the head, and means for maintaining said spring in position.

2. In an automatic train pipe coupling, the combination of a base, a plate or flange normally engaging said base, a coupling head in front of said base, a plurality of spaced members extending from the head into engagement with said plate, a spring supporting said head, and means for detachably securing said members to said plate.

3. In an automatic train pipe coupling, the combination of a coupling head having an opening substantially at its center, a base, and means on said base for supporting said head for universal movement, said means comprising spaced connected members detachably secured to said head on opposite sides of said opening.

4. In an automatic train pipe coupling, the combination of a coupling head having an opening, a base, means on said base for supporting said head for universal movement, said means comprising spaced connected members suitably secured to said head, a conduit loosely mounted in said opening, and means on one of said members for maintaining said conduit in said opening.

5. In an automatic train pipe coupling, the combination of a sheet metal coupling head, a fluid conduit formed separately of said head and arranged at substantially the center of said head, a base, and means on said base for supporting said head for universal movement, said means comprising two separate spaced members rigidly connected at their rear ends and detachably secured to said head on opposite sides of said conduit, and cooperating means carried by said spaced members and said conduit for holding the conduit in position.

6. In an automatic train pipe coupling, the combination of a coupling head, a fluid conduit at substantially the center of said head, a base, two separate spaced members rigidly connected at their rear ends and detachably secured to said head on opposite sides of said conduit, means on said base for yieldingly supporting said head for universal movement, said means comprising a spring and a universal joint carried by said base, and means carried by said spaced members for removably maintaining said conduit in position between said spaced members whereby the conduit may be removed and replaced at will.

7. In an automatic train pipe coupling, a base having perforated projections at opposite sides thereof, a coupling head, a yoke for supporting said head in front of said base, said yoke having spaced members adapted to engage in the perforations of said projections, and means arranged at the rear of said base for yieldingly holding said yoke and head projected in front of said base.

8. In an automatic train pipe coupling, a coupling head, a base, means for supporting the head for universal movement relative to the base, said means including spaced members secured to the head at separated points and other spaced members pivotally engaging said base at separated points.

9. In an automatic train pipe coupling, a base, a coupling head, means for supporting the head for universal movement relative to the base, said means comprising two members secured to said head at separated points, and two other members pivotally engaging said base, all of said members being rigidly connected.

10. A supporting yoke for supporting an automatic train pipe connector head from a bracket, said yoke comprising two spaced members adapted to be connected to a coupling head and two other spaced members adapted to engage the bracket, all of said members being rigidly connected and the last two members being arranged in a plane substantially at right angles to the plane including said first two members.

11. In an automatic train pipe coupling, a coupling head, a bracket, a yoke for supporting said head from the bracket, said yoke comprising two spaced members arranged one above the other and secured at separated points to said head and also including two other spaced members arranged in a substantially horizontal plane and pivotally engaging said bracket at separated points.

12. In an automatic train pipe coupling, a bracket having on each side a perforated projection, a coupling head, a supporting yoke therefor, said yoke comprising two front spaced members arranged in a substantially vertical plane and secured at spaced points to said head and also two rear spaced members arranged in substantially a horizontal plane and extending through the openings in said projections, a flange connecting the rear ends of said rear spaced members and means for yieldingly holding said flange against said bracket.

In testimony whereof I affix my signature.

JOSEPH ROBINSON.